United States Patent [19]

Fabish

[11] E Re. 29,227

[45] Reissued May 24, 1977

[54] GEAR CHECKING MACHINE HAVING A FRICTIONALLY DRIVEN SUPPORT TABLE AND POSITION ENCODER

[75] Inventor: Edward Francis Fabish, Austin, Tex.

[73] Assignee: Illinois Tool Works Inc., Chicago, Ill.

[22] Filed: Mar. 17, 1976

[21] Appl. No.: 667,744

Related U.S. Patent Documents

Reissue of:

[64] Patent No.: 3,882,720
Issued: May 13, 1975
Appl. No.: 425,436
Filed: Dec. 17, 1973

[52] U.S. Cl. ..... 73/162; 33/DIG. 14
[51] Int. Cl.[2] ..... G01M 13/02
[58] Field of Search ..... 73/162; 33/DIG. 14

[56] References Cited

UNITED STATES PATENTS

| | | | |
|---|---|---|---|
| 2,407,996 | 9/1946 | Nies | 274/1 K X |
| 2,484,022 | 10/1949 | Esval | 177/380 |
| 2,983,141 | 5/1961 | Vanator | 73/162 |
| 3,522,524 | 8/1970 | Smith et al. | 73/162 X |

*Primary Examiner*—Jerry W. Myracle
*Attorney, Agent, or Firm*—Glenn W. Bowen; Robert W. Beart

[57] ABSTRACT

A gear checking machine for measuring the involute profile and the helical lead of a gear having a support table which is coupled to a base disc that is driven by a friction drive mechanism is disclosed. The friction drive is achieved by means of a small drive wheel which drives the large base disc which has its shaft coupled to the rotatable support table. An encoder having a small drive wheel which is frictionally driven by the large base disc is employed whereby the encoder supplies electrical output signals representative of the degree of rotation of the support table and the gear. Involute and lead checking probes are mounted so they may move in the horizontal and vertical directions, respectively, relative to the gear being checked.

5 Claims, 3 Drawing Figures

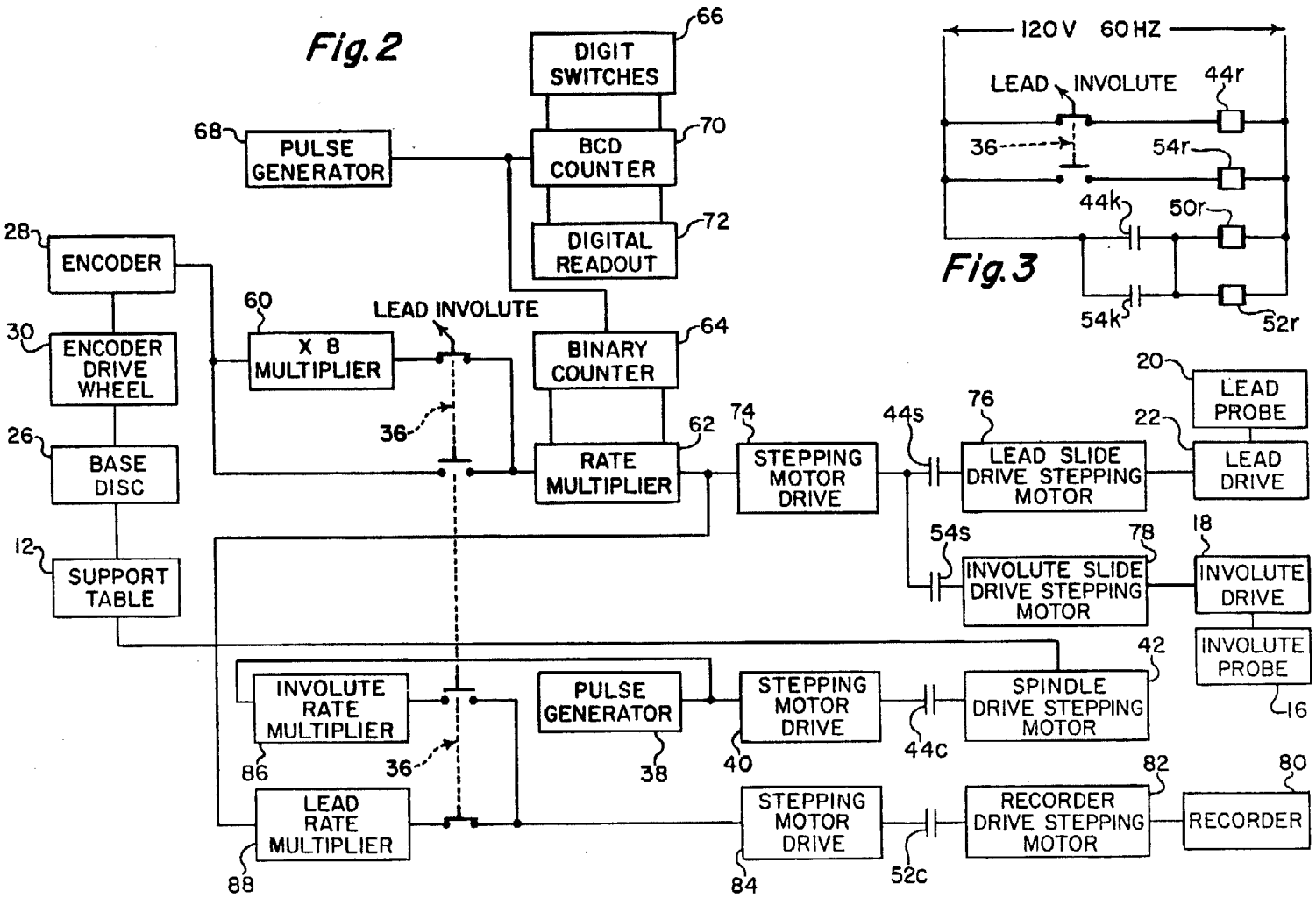
120 V 60 HZ
LEAD
INVOLUTE
36
44r
54r
50r
44k
54k
52r
Fig. 3
LEAD PROBE
LEAD DRIVE
INVOLUTE DRIVE
INVOLUTE PROBE
RECORDER
LEAD SLIDE DRIVE STEPPING MOTOR
INVOLUTE SLIDE DRIVE STEPPING MOTOR
SPINDLE DRIVE STEPPING MOTOR
RECORDER DRIVE STEPPING MOTOR
STEPPING MOTOR DRIVE
STEPPING MOTOR DRIVE
STEPPING MOTOR DRIVE
DIGIT SWITCHES
BCD COUNTER
DIGITAL READOUT
BINARY COUNTER
RATE MULTIPLIER
PULSE GENERATOR
PULSE GENERATOR
LEAD INVOLUTE
X 8 MULTIPLIER
INVOLUTE RATE MULTIPLIER
LEAD RATE MULTIPLIER
ENCODER
ENCODER DRIVE WHEEL
BASE DISC
SUPPORT TABLE
Fig. 2

GEAR CHECKING MACHINE HAVING A FRICTIONALLY DRIVEN SUPPORT TABLE AND POSITION ENCODER

Matter enclosed in heavy brackets [ ] appears in the original patent but forms no part of this reissue specification; matter printed in italics indicates the additions made by reissue.

BACKGROUND OF THE INVENTION

This invention concerns a gear checking machine which is particularly useful in measuring helical lead and involute gears, especially large gears those on the order of 40 to 60 inches or more in diameter. The measurement of the helical lead and of the involute both require an accurate timed relationship between a rotating axis and linearly driven test probe. Prior art involute checkers utilize a ratio bar in conjunction with a master base circle sector or disc. This type of machine had physical limitations which placed severe limitations on the accuracy of the machine and the configuration of the gear support table in the measurement of large gears on the order of 40 to 60 inches or more in diameter. The timed relationship between a rotating axis and linear motion of the helical lead testing machines of the prior art is generally accomplished by a sine bar unit which transmits an accurate angular measurement. Machines incorporating these device are to be seen in U.S. Pat. Nos. 2,787,060 and 2,998,657.

The present invention eliminates the ratio bar and sine bar and utilizes a large disc or base circle which is coupled to the gear support table. The large base circle is operatively attached to an encoder which accurately registers by electronic pulses the angular or rotary movement of the base disc. The input of this encoder advantageously is achieved by utilizing a very small diameter disc which is normally driven by the outer periphery of the large base disc. This large ratio between the base disc and the encoder disc provides a large range of accuracy in determining the angular movement of the disc.

Two simple discs with properly calculated diameters rotating with each other can provide a much wider range of ratio and accuracy than that obtainable by another device.

A number of advantages are gained by this device in proportioning, manufacturing and in assembly. These are:

1. Flexibility — large ratio range can be obtained.
2. Changes can be readily made by changing diameter of mating disc.
3. Round configuration — easy to make — easy to manufacture.
4. Exact ratio can be obtained by simple regrinding of the smaller disc.
5. Positive drive can be obtained by holding the discs in contact by means of springs, adjustable pressure bar, weights, etc.

In summary, incorporation of base disc principle in conjunction with stepping motors and gear boxes, provides a wide range of proportioning at a very low cost not possible with other known methods.

It is therefore an object of the present invention to provide a gear checking machine having a rotatable table for supporting a gear to be checked which is coupled through a shaft to a large diameter base disc which is frictionally driven by a small diameter wheel that is in engagement with the periphery of the large base disc wherein the large base disc in turn frictionally drives a small wheel which is coupled to a position indicating encoder.

It is an additional object of the present invention to provide a gear checking machine which has a rotatable table for supporting a gear to be checked wherein the table is coupled to a large diameter base disc having a circular cross-sectional configuration, the periphery of which is utilized to drive a disc of a predetermined diameter which is substantially smaller than the diameter of the base disc and which is coupled to an encoder to provide a signal which is indicative of the degree of rotation of the support table.

It is a further object of the present invention to provide a drive and encoding system for a gear checking machine in which a table for supporting the gear to be checked may be driven at a rate which may be easily varied by changing the diameter of a small drive wheel that it utilized to frictionally drive a large base disc which is coupled to the rotatable table and the resolution of the encoder, which emits signals which are representative of the rotation of the table, may be easily varied by changing the diameter of a small wheel which is frictionally driven by the large diameter base disc.

Other objects and advantages of the present invention will be apparent to those skilled in the art from the disclosure of this invention.

DESCRIPTION OF THE DRAWINGS

The invention is illustrated in the drawings in which;

FIG. 2 is a block diagram of the control circuitry of the gear checking machine of FIG. 1.

TECHNICAL DESCRIPTION OF THE INVENTION

Figure 1:
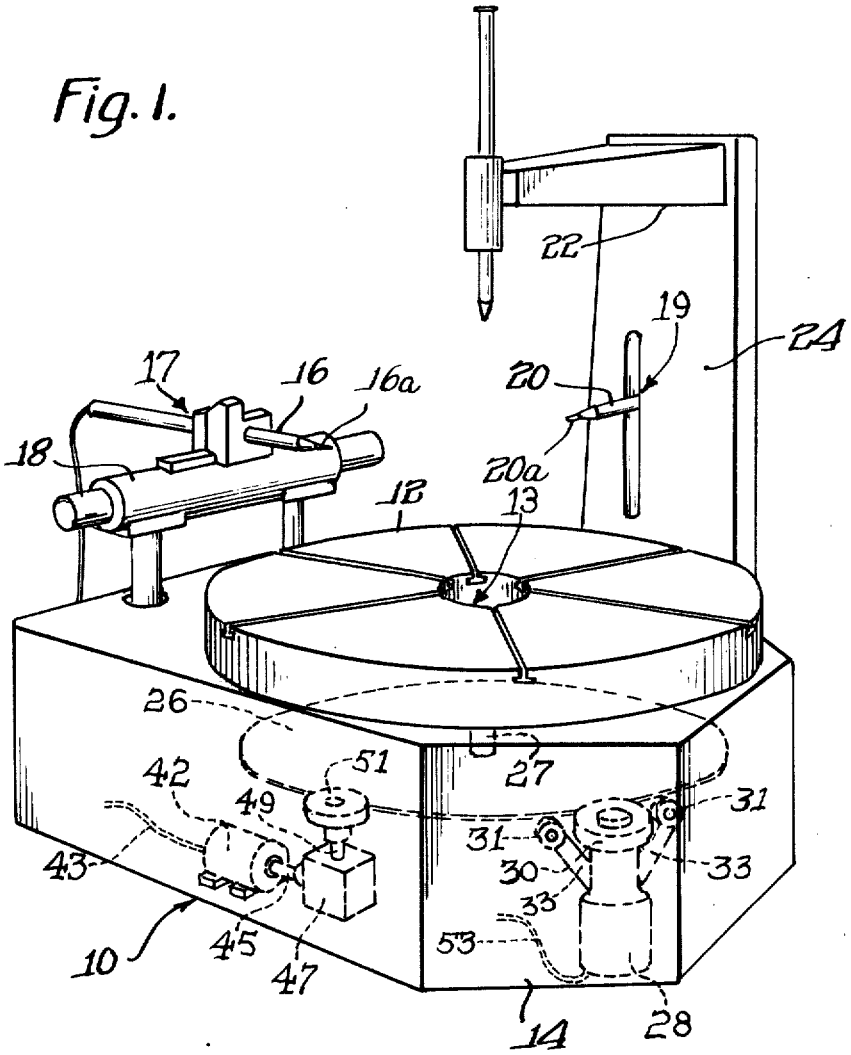
FIG. 1 is a perspective view of the gear checking machine of the present invention which shows the large base disc, the friction drive mechanism and the encoder of the present invention.

A perspective view of the gear checking machine 10 of the present invention is shown in the FIG. 1. The gear that is to be checked is placed on the large table 12 which is supported by the base 14. The table drive motor (not shown) is mounted within the base 14 to rotate the table 12 at a controlled rate. The involute measuring probe 16 is mounted for linear horizontal movement along the involute slide 17 by the involute probe drive mechanism 18. The lead measuring probe 20 is mounted for linear movement in a vertical direction in the elongated slot 19 by the lead probe drive mechanism 22 which is supported by the brace 24. The probes 16 and 20 may be pressure sensitive probes of the type generally employed in the gear checking art in which pressure applied to the sensing ends 16a, 20a, respectively, of the probes 16 and 20 control the movement of a magnetic slug in a variable differential transformer (not shown) so as to develop an electrical signal which is a function of the magnitude of the pressure on the measuring probe.

On the bottom of the support table 12 and within the base 14, a large circular base disc 26 is secured to the shaft 27 which is in turn coupled to the table 12 so that the table 12 is driven in rotation with the disc 26. Suitable conventional bearings (not shown) are provided to allow for easy rotation of the table 12. An encoder 28 of a conventional type may be mounted to the base 14 by bolts or the like which are inserted into the holes 31 in the arms 33, and has a small driven wheel 30 which is driven by the large base disc 26 to provide encoded signals which are representative of the angular rotation of the support table 12. The diameter of the base disc 26 is approximately equal to the diameter of the table 12 and preferably at least 10 times as large as the diameter of the encoder wheel 30 to insure that the encoder will respond to relatively small angular rotations of the table 12.

In order to provide for accurate measurement of the involute and the helical lead of a gear, it is necessary that the movement of the support table 12 be accurately synchronized with the linear movement of the involute probe 16 and the lead probe 20. The electrical system of the present invention which achieves the desired control is shown in block diagram in FIGS. 2 and 3.

In the gear checking machine of the present invention either the helical involute or the lead may be checked at a given time. Selection of either the lead or involute measuring function is made by the multiple gang section switch 36 which is shown in the FIGS. 2 and 3. The position of the switch 36 in FIGS. 2 and 3 is shown at the lead checking position. When the switch 36 is in the lead checking position the vertical motion of the lead probe 20 is synchronized with the rotation motion of the table 12. The driving system for the table 12 is achieved by use of a pulse generator 38 which is coupled to a stepping motor drive system 40 which supplies driving pulses to the spindle drive stepping motor 42. When the switch 36 is in the lead measuring position, the relay 44r will close the contacts 44k and this will energize both the relays 50r and 52r. The relay 50r acts to close the contact 44c while the relay 52r closes the contact 52c which allows a recorder 80 to be driven at a synchronous rate, as is described subsequently in more detail. When the switch 36 is in the involute position the relay 54r is energized rather than the relay 44r. This causes the contacts 54k to close thereby again energizing both relays 50r and 52r, and, thus, again closing contacts 44c and 52c.

The spindle drive motor 42 is energized and receives driving signals through the cable 43. As the spindle drive motor 42 is stepped, the output shaft 45 of the motor 42 is driven. The shaft 45 drives the gear box 47 which in turn drives the shaft 49 which is coupled to the friction drive wheel 51. The gear box 47 preferably provides a reduction rate of at least 10 to one, and the diameter of the drive wheel 30 is preferably equal to the diameter of the encoder wheel 30. The high resolution of the drive and encoding system of the present invention is illustrated by typical parameters for the components of the system. For example, the diameter of the base disc 26 may be 40 inches. The stepping motor 42 then may make one revolution resulting in one revolution of the encoder 28. If the encoder 28 produces 25,000 pulses in one revolution of disc 30 then 10 revolutions or 2,500,000 pulses will be produced when table 12 is revolved one turn. It is seen, therefore, that the encoder system of the present invention is one in which each output pulse of the encoder 38 may represent a relatively small amount of angular rotation of the gear being tested. The rotation of the encoder 28 provides a coded representation of the rate of angular displacement of the table 12 which consists of a series of pulses of a rate which corresponds to the rate of rotation of the table 12. This series of pulses from the encoder 28 is supplied through the cable 53 to multiplier 60 which emits multiple output pulses for every one input pulse that it receives.

The purpose of the rate multiplier 60 is to increase the speed of the lead profile probe 20. It is noted that when the switch 36 is in the involute position the rate multiplier 60 is bypassed and the output pulse from the encoder 38 is fed directly to the rate multiplier 62. This is because the lead measuring probe 20 must be driven at a faster rate than the involute measuring probe 16 for long leads. Aside from this factor, however, both the involute and the lead probes are controlled in substantially the same manner.

The purpose of the rate multiplier 62 is to provide a series of output pulses which occur at a predetermined fractional rate of the input pulses from the encoder 28. The rate multiplier 62 is constructed to multiply the signal from the encoder 28 by a variable preset factor rather than by a constant factor. In the checking of any given gear it is necessary to establish either manually, or by means of a recorded program, the appropriate preset factors that are to control the rate multiplier 62 for both the involute and the lead checking cycles. These factors are digital numbers which when contained in the binary counter 64, which is coupled to the rate multiplier 62, establish the appropriate frequency multiplication factor to synchronize the speed of the lead and involute probes 16, 20 with the rate of rotation of the table 12. The rate multiplier 62 is a known type of device, and one suitable type of circuit for use in the present is the K1848 multiplier sold by Digital Equipment Corporation of Maynard, Mass.

The manner in which the preset multiplication factor is established in the binary counter 64 can be seen by reference to the FIG. 3. The desired digital number which is needed to establish the appropriate ratio of the rate multiplier 62 may be set into the digit switches 66. The pulse generator 68 then supplies pulses to the binary coded decimal (BCD) counter 70, which is initially set to a count that is established by the digit switches 66. The BCD counter 60 counts down to zero. A digital readout 72, which is coupled to the counter 70, supplies a continuous visual indication of the contents of the counter 70. The binary counter 64 is initially at a zero count when the BCD counter is set at the count of the digit switches 66. The binary counter 64 counts up and continues counting until the count established by the digit switches 66 has been reached, at which time the count in BCD counter 70 will be zero.

With the correct multiplication factor for the rate multiplier 62 being established by the count in the counter 64 the rate multiplier 62 will supply pulses to a conventional stepping motor drive circuit 74 in accordance with the preset factor in the switches 66 thereby providing the required synchronization of the linear motion of the probes 16, 20 with the rotation of the table 12. When the switch 36 is in the lead measuring position, the relay 44r is energized and the contact 44s is closed which allows the stepping motor drive circuit 74 to drive the lead slide drive stepping motor 76 and the lead drive mechanism 22 through the closed contacts 44s. On the other hand, when the switch 36 is in the involute measuring position the contacts 44s are open and the contacts 54s are closed which allows the stepping motor control circuit 74 to drive the involute slide drive stepping motor 78 and the involute drive mechanism 18 through the closed contacts 54s.

In order to obtain a permanent written record of the gear being checked a recorder 80 is employed. The recorder 80 is driven by a recorder drive stepping motor 82 which is supplied pulses from the stepping motor drive circuit 84 through the contacts 52c. The recorder stepping motor drive rate is generally different according to whether the involute probe 16 is being driven or the lead probe 20 is being driven. This is achieved through the switch 36 which allows either the involute rate multiplier 86 or the lead rate multiplier 88 to be coupled to the stepping motor control system 84. The rate multipliers 86 and 88 are similar to the multiplier 60 in that they multiply the incoming pulses by a fixed ratio to provide output pulses with a frequency which is suitable for synchronizing the recorder 80 with linear motion of the probes 16, 20 and the rotational motion of the table 12.

The encoder system of the above-described invention provides a number of advantages over conventional encoder system. The encoder system allows for the use of a relatively inexpensive encoder 28 to produce 10 or more times as many pulses as could be produced by the usual method of mounting. The usual method of mounting would put the encoder on the same axis as the table 12. An encoder mounted in the usual fashion on the axis of table 12 would have to produce 10 times as many pulses and would be very large and expensive, perhaps eight or 10 times more expensive to do the same job.

Also mounting the encoder to the side of the base disc 26 below the table 12, as shown in FIG. 1, allows for a large hole 13 in the table 12. This is very important because it allows for checking of long shaft type gears by dropping the shaft down the table hole 13 and resting the gear on the table 12. Without a large hole in the gear support table the utility of a gear checking instrument is severely limited.

The invention is claimed as follows:

1. A gear checking machine comprising a frame, indicating means, a table rotatably mounted in said frame for supporting a gear to be checked, sensing means mounted adjacent said gear for supplying a signal to said indicating means which is indicative of the surface variations of said gear, a first shaft, a relatively large diameter circular disc coupled to said table by said first shaft and supported; below said table by said first shaft, first and second small circular wheels each having a diameter substantially smaller than the diameter of said large disc, said first small wheel having its periphery in engagement with the periphery of said large disc, *a second shaft coupled to said first small wheel, said second small wheel having its periphery in engagement with the periphery of said large disc*, disc drive means coupled to said second shaft for simultaneously revolving said first and second small wheels, said table and said large disc, sensing drive means for driving said sensing means in synchronism with said table and said disc, a third shaft coupled to said second small wheel and encoder means coupled to said third shaft for supplying output signals which are a function of the rotation of said table.

2. A gear checking machine as claimed in claim 1 wherein said first and second small wheels are of approximately the same diameter.

3. A gear checking machine as claimed in claim 1 wherein said drive means comprises a gear reduction means coupled to said second shaft.

4. A gear checking machine as claimed in claim [ 2 ] *3* wherein said drive means comprises a stepping motor having an output shaft which is coupled to said gear reduction means.

5. A gear checking machine as claimed in claim 4 wherein said first and second small wheels are of approximately the same diameter.

* * * * *